(12) United States Patent  
Haskal et al.

(10) Patent No.: US 10,156,342 B2  
(45) Date of Patent: Dec. 18, 2018

(54) LIGHTING DEVICE WITH ELASTIC ENVELOPE

(71) Applicant: PHILIPS LIGHTING HOLDING B.V., Eindhoven (NL)

(72) Inventors: Eliav Itzhak Haskal, Eindhoven (NL); Hugo Johan Cornelissen, Eindhoven (NL); Maarten Van Lierop, Eindhoven (NL); Henricus Franciscus Bonekamp, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 51 days.

(21) Appl. No.: 15/038,214

(22) PCT Filed: Nov. 19, 2014

(86) PCT No.: PCT/EP2014/074955  
§ 371 (c)(1),  
(2) Date: May 20, 2016

(87) PCT Pub. No.: WO2015/075043  
PCT Pub. Date: May 28, 2015

(65) Prior Publication Data  
US 2016/0290605 A1   Oct. 6, 2016

(30) Foreign Application Priority Data  
Nov. 25, 2013   (EP) ...................................... 13194265

(51) Int. Cl.  
*F21V 14/06* (2006.01)  
*F21V 3/04* (2018.01)  
(Continued)

(52) U.S. Cl.  
CPC ................ *F21V 3/049* (2013.01); *F21K 9/23* (2016.08); *F21K 9/232* (2016.08); *F21K 9/66* (2016.08);  
(Continued)

(58) Field of Classification Search  
CPC ...... F21V 3/0436; F21V 3/0445; F21V 3/049; F21V 14/06; F21V 14/08; F21K 9/65; F21K 9/66  
(Continued)

(56) References Cited

U.S. PATENT DOCUMENTS 3,955,908 A * 5/1976 Farrell .................... B29C 49/06  
425/390  
5,311,409 A * 5/1994 King ...................... G03B 15/06  
362/17  
(Continued)

FOREIGN PATENT DOCUMENTS

CN       202868396 U    4/2013  
DE       10022164 A1    11/2001  
(Continued)

OTHER PUBLICATIONS

Nopper Hans, Nov. 15, 2001, "Lampshade comprises a mesh of deformable stiffening wires embedded into a layer of plastic material", Espacenet Patent Translate Powered by EPO and Google, Bibliographic data: DE10022164(A1), Claims DE10022164 and Description DE10022164.*  
(Continued)

*Primary Examiner* — Alan Cariaso  
(74) *Attorney, Agent, or Firm* — Akarsh P. Belagodu

(57) ABSTRACT

A lighting device (100, 200, 300, 400) is disclosed, comprising an at least partly light transmitting envelope (110) arranged to at least partly enclose a light source (120). The envelope comprises a portion (114) that is elastic such that (Continued)

its extension and orientation relative to a nominal optical axis of a base (140) of the lighting device is adjustable so as to allow for light output from the lighting device to be modified. A method for manufacturing such lighting device is also disclosed.

13 Claims, 6 Drawing Sheets

(51) Int. Cl.

| | | |
|---|---|---|
| F21V 3/06 | (2018.01) | |
| F21K 9/232 | (2016.01) | |
| F21V 5/00 | (2018.01) | |
| F21V 5/04 | (2006.01) | |
| F21V 7/00 | (2006.01) | |
| F21V 19/00 | (2006.01) | |
| F21K 9/23 | (2016.01) | |
| F21V 3/02 | (2006.01) | |
| F21K 9/66 | (2016.01) | |
| B29L 31/00 | (2006.01) | |
| B29K 105/00 | (2006.01) | |
| B29C 49/06 | (2006.01) | |
| B29C 49/58 | (2006.01) | |
| F21Y 103/10 | (2016.01) | |
| F21Y 115/10 | (2016.01) | |
| F21Y 101/00 | (2016.01) | |

(52) U.S. Cl.
CPC ............... *F21V 3/02* (2013.01); *F21V 3/062* (2018.02); *F21V 5/005* (2013.01); *F21V 5/045* (2013.01); *F21V 7/00* (2013.01); *F21V 14/06* (2013.01); *F21V 19/006* (2013.01); *B29B 2911/1436* (2013.01); *B29C 49/06* (2013.01); *B29C 2049/5803* (2013.01); *B29C 2791/007* (2013.01); *B29K 2105/258* (2013.01); *B29L 2031/747* (2013.01); *F21Y 2101/00* (2013.01); *F21Y 2103/10* (2016.08); *F21Y 2115/10* (2016.08)

(58) Field of Classification Search
USPC .................................................. 362/278, 320
See application file for complete search history.

(56) References Cited

U.S. PATENT DOCUMENTS

| | | | |
|---|---|---|---|
| 5,408,389 A | 4/1995 | Burlingame | |
| 5,984,492 A * | 11/1999 | Cha | F21S 10/00 |
| | | | 362/278 |
| 7,331,697 B1 * | 2/2008 | Hulse | F21K 9/00 |
| | | | 362/551 |
| 7,857,490 B1 | 12/2010 | Fett et al. | |
| 7,942,556 B2 * | 5/2011 | Harbers | F21K 9/54 |
| | | | 362/230 |
| 8,215,803 B2 * | 7/2012 | Singer | F21V 3/00 |
| | | | 362/255 |
| 9,605,813 B2 * | 3/2017 | Collias | F21K 9/65 |
| 9,772,093 B2 * | 9/2017 | Yu | F21V 19/02 |
| 2006/0034077 A1 | 2/2006 | Chang | |
| 2009/0122549 A1 * | 5/2009 | Hou | F21V 5/04 |
| | | | 362/282 |
| 2009/0141491 A1 | 6/2009 | Chu | |
| 2012/0188771 A1 | 7/2012 | Kraus | |
| 2013/0107545 A1 | 5/2013 | Tai et al. | |
| 2013/0294071 A1 | 11/2013 | Boomgaarden et al. | |

FOREIGN PATENT DOCUMENTS

| | | | |
|---|---|---|---|
| DE | 102008003352 A1 | 7/2009 | |
| FR | 1003026 A | 3/1952 | |
| GB | 2454562 A | 5/2009 | |
| JP | 59173904 A * | 10/1984 | ............... H01B 1/22 |
| JP | S59173904 A | 10/1984 | |
| JP | 59082909 U | 11/1984 | |
| JP | 2004119045 A | 4/2004 | |
| JP | 2008251512 A | 10/2008 | |
| JP | 03169860 U | 8/2011 | |
| JP | 2013012310 A | 1/2013 | |
| WO | WO199902918 A1 | 1/1999 | |

OTHER PUBLICATIONS

Morio Ito, Jun. 5, 1984, "Lighting fixtures that can change the lighting range", Machine Translation JP59082909U, JP Classification, Claims and Description of Drawings.*

Shibata Saki, "Notification of Reasons for Refusal", dated Aug. 3, 2018, Patent Application No. 2016-533020, pp. 1-7.*

OSRAM Melco Ltd., Apr. 15, 2004, Espacenet EPO translation, JP2004119045A, pp. 1-23.*

Toshiba Lighting & Technology, Oct. 16, 2008, Espacenet EPO translation, JP2008251512A, pp. 1-13.*

Aoyamakasei Co., Jan. 17, 2013, Translation, JP2013-012310, pp. 1-14.*

Office Action dated Aug. 10, 2018 From Corresponding Japanese Application No. 2016-533020, JP S59173904, of Which an English Translation Cannot be Found (9 Pages).

* cited by examiner

LIGHTING DEVICE WITH ELASTIC ENVELOPE

CROSS-REFERENCE TO PRIOR APPLICATIONS

This application is the U.S. National Phase application under 35 U.S.C. § 371 of International Application No. PCT/EP2014/074955, filed Nov. 19, 2014, which claims the benefit of European Patent Application No. 13194265.8, filed Nov. 25, 2013. These applications are hereby incorporated by reference herein.

FIELD OF THE INVENTION

The present invention relates to a lighting device having an elastic light transmitting envelope, and to a method for manufacturing such a lighting device.

BACKGROUND

The possibility to control or modify light from a lighting device is of interest for various applications, such as general illumination, room lighting, exterior lighting, decorative lighting, spot lighting etc. Depending on the application, a specific light distribution in terms of light distribution angle or light beam orientation relative to an optical axis of the lighting device may be desired.

In for example US 2013/0294071 A1, a bulb with a prismatic optics is used to obtain a nearly uniform distribution of light about a luminaire. The prismatic optics include several optic parts having sidewalls with light refracting grooves and protruding members. The grooves and the protruding members are formed to alter the refraction of light emitted from the luminaire so as to achieve a more uniform light distribution.

Although such devices may provide a desired light distribution, there is still a need for improved lighting devices and also methods for manufacturing such devices.

SUMMARY OF THE INVENTION

It is an object of the present invention to provide an improved lighting device capable of providing a desired output of light. In particular, it would be desirable to achieve a lighting device capable of providing a light beam or output of light having a desired orientation or light distribution.

It is also an object of the present invention to provide a method for manufacturing such a device.

These and other objects are achieved by means of a lighting device and a method having the features defined in the independent claims. Preferable embodiments of the invention are characterized by the dependent claims.

Hence, according to a first aspect of the present invention, a lighting device is provided. The lighting device comprises a light source, a base extending along a nominal optical axis, and an at least partly light transmitting envelope arranged to at least partly enclose the light source. A first portion of the envelope is adapted to output at least part of light emitted by the light source, and a second portion of the envelope is elastic such that its extension and orientation relative to the nominal optical axis is adjustable.

In embodiments according to the first aspect, an envelope that can be adjusted in terms of orientation and extension relative to the nominal optical axis, or the base, can be used for modifying the light output from the lighting device. Changing the envelope's orientation relative to the base may e.g. allow for an emitted light beam to be redirected relative to the nominal optical axis of the base of the lighting device. Further, adjusting the envelope's extension along the nominal optical axis of the base may affect the shape of the light beam or the distribution of light emitted from the lighting device, e.g. in terms of distribution angle, cone angle or width of the emitted light beam, intensity distribution, and a focal distance.

The nominal optical axis should, in the context of the present application, be understood as an axis along which the base is aligned or arranged or having an extension. Alternatively, or additionally, the nominal optical axis may refer to a direction in which light may be emitted from the light source, and may e.g. correspond to an initial path of light originating from the light source. The nominal axis could be referred as an (optical) axis of the base but also of the lighting device when the second portion extends along the same axis as the base and the first portion. In other words, the nominal optical axis could be an optical axis of the lighting device when the base, the second portion and the first portion are aligned, without having the second portion bent, i.e. when the second portion extends along the same axis as the base and the first portion. The base, which also may be referred to as a support or socket, may be adapted to fit the lighting device in an external holder or luminaire. Preferably, the second portion of the envelope may be releasably or permanently attached or fixed to the base.

The second portion of the envelope being elastic should in the context of the present application be understood as an ability to resume a normal or nominal shape after being deformed or reshaped, such as e.g. extended, stretched, compressed, squeezed, expanded or bent relative to a nominal shape. The term 'shape' should be understood as at least an extension along the nominal optical axis of the base (or the lighting device in a nominal state) and/or an orientation relative to said axis or base. A nominal shape could refer to any shape preceding a present shape, or to an initial, normal or original shape. The second portion may be able to resume the nominal shape by its own motion or passively, i.e. by action of e.g. an applied or added force. In the latter case, the second portion and hence the envelope can be reversibly reshaped or deformed into a shape that differs from the nominal shape and lasts or remains for a given period of time, preferably until the second portion actively is brought into another shape, such as e.g. the nominal shape or a previous shape. A lock and release mechanism may be provided to maintain a desired shape. Preferably, a person or user can himself or herself adjust the lighting device by pulling or pushing.

The envelope may be adapted to transmit at least some of light emitted from the light source and to output said light from the lighting device. The output light may be transmitted at least through a portion of the first portion of the envelope, which first portion may optionally be provided with an optical structure, such as a diffractive structure or a refracting structure. The optical structure may be configured to allow for a specific desired optical effect to be achieved, and may e.g. include a focusing lens, such as e.g. a Fresnel lens.

The first portion may define an optical axis along which light can be emitted from the lighting device. In other words, the term "optical axis" may refer to a direction or path of light emitted or output from the first portion, whereas the "nominal optical axis" may refer to an axis along which the base or support has an extension. The optical axis of the first portion may be directed along the nominal optical axis of the base or in a direction intersecting the nominal optical axis.

The nominal optical axis may e.g. coincide or correspond to the optical axis when the base, the second portion and the first portion are aligned, without having the second portion bent, i.e. when the second portion extends along the same axis as the base and the first portion.

Further, the first and/or second portion(s) may comprise an at least partly light reflecting portion adapted or arranged to reflect at least some light generated by the light source. The light reflecting portion may e.g. be adapted to redirect light from the light source by means of internal reflection, thereby allowing for a collimating effect or an at least partly focused light beam to be emitted from the lighting device.

The properties of the output light may be varied in terms of e.g. intensity distribution, illumination pattern, orientation relative to the optical axis or the nominal optical axis, diffusivity, and color distribution depending on the shape of the envelope, any optical structures and/or light reflecting portions provided at the surface of the envelope. The output light may be provided with an optical effect such as collimation, scattering, lensing, various watermarking or trade marking effects, far field effects and near field effects. The output light may e.g. form a light beam that is emitted from the lighting device at a given angle relative to the nominal optical axis of the base. By "optical axis of the base" is meant the extension within the base of the optical path (or light beam) out of the base. The optical axis of the base may in fact be considered as an "extension" axis of the base. It will also be appreciated that the light source may be placed anywhere in or at the base, or even outside the base.

The present aspect is advantageous in that it allows for at least some of the properties and optical effects of the output light to be adjusted by means of the elastic second portion of the envelope.

According to embodiments of the present invention, the second portion is extendible and compressible such that a focal point of the first portion is moveable along the nominal optical axis. In other words, the extension of the second portion at least along the nominal optical axis can be increased and reduced, respectively, relative to a nominal extension such that the focal point is moved accordingly. In one example, the lighting device is adapted to emit a light beam through the first portion, wherein the light beam has a distribution angle relative to an optical path of the light beam (or an optical axis of the first portion) and wherein the second portion is extendible and compressible such that the distribution angle can be adjustable. In another example, a distance between the first portion and the light source can be reduced by means of the compressible second portion such that the light source is arranged between the first portion and its focal point. This relative position of the focal point and the first portion is advantageous in that it allows for a relatively wide light beam to be emitted from the lighting device, i.e. a light beam that may be divergent and have a relatively wide light cone or distribution angle. Further, the distance between the first portion and the light source can be increased by means of the extendible second portion such that the focal point can be arranged between the light source and the first portion as seen along the nominal optical axis. Arranging the focal point between the light source and the first portion is advantageous in that a relatively narrow or focused light beam may be provided, which may have a relatively small light cone angle as compared to the case wherein the light source is arranged between the focal point and the first portion.

The first portion may e.g. comprise a refracting or focusing lens, such as e.g. a Fresnel lens, which may be oriented such that its focal point coincides with the nominal optical axis of the base or such that an optical axis of the lens at least is directed along the nominal optical axis of the base.

The possibility of extending and compressing the second portion such that the focal point is moved along the nominal optical axis of the base is advantageous in that it allows for a light beam having an adjustable beam width or light distribution angle relative to the optical path of the light beam.

According to an embodiment, the second portion is bendable in a direction intersecting the nominal optical axis. In other words, the second portion is bendable relative to the base such that the nominal optical axis may intersect a wall of the envelope. This is advantageous in that it allows for light output from the first portion, such as e.g. an emitted light beam, to be pointed at or redirected in a desired direction relative to the nominal optical axis. Bending the second portion may allow for collimating or reflecting properties of the envelope to be adjusted, so as to achieve a desired optical effect.

According to an embodiment, the second portion is arrangeable in a nominal state from which the second portion is extendible into a first state and compressible into a second state. The first state and the second state differ from each other and from the nominal state at least in terms of extension and/or orientation relative to the nominal optical axis (or the base). The second portion, and hence the envelope, may be adapted to last in a specific state until it is actively brought into another state by the action of e.g. a user or an actuating means (actuator). In other words, the lighting device may remain, or be fixed or locked, in a given state for a desired period of time, e.g. by means of a lock and release mechanism.

According to an embodiment, a focal point of the first portion may coincide with a position of the light source as the second portion is in its nominal state. Hence, the light source can be moved in and out of focus as the second portion is extended or compressed into the first and second state, respectively. Arranging the focal point at the position of the light source also allows for an image of the light source to be produced by the light emitted from the lighting device.

According to an embodiment, the second portion may be reversibly foldable. The second portion may e.g. be bent over itself so that one part of it at least partly covers another as the second portion is compressed. As the second portion is extended or decompressed, it may be at least partly unfolded as compared with the folded state. The second portion may e.g. be bellow-shaped, i.e. having a concertinaed sidewall allowing the second portion to expand and contract during extension and compression.

According to an embodiment, an outer surface of the first portion may be provided with a light refracting structure comprising at least one of grooves, protrusions, microgrooves, micro-protrusions, micro-prismatic grooves, micro-prismatic protrusions, a lens, a Fresnel lens and a diffraction grating. The optical structure may e.g. be light refracting and/or light diffracting so as to provide a desired optical effect, including e.g. focusing or defocusing of an emitted light beam, visual pattern in the near field of far field, or a specific color distribution.

According to some embodiments, the first portion and the second portion may form a single piece. Further, at least one of the first and the second portions may comprise an at least partly light transmitting plastic material, which e.g. may be blow molded so as to form an envelope having a desired shape and/or optical properties.

According to an embodiment, the light source may comprise a solid state light source. The solid state light source may e.g. comprise a light emitting diode (LED). It will however be understood that the solid state light source may in principle comprise any kind of solid state element that is able to generate and emit light. Solid state light sources are advantageous in that they generate light at a relatively lower heat generation, in particular as compared to incandescent light sources. A relatively lower heat generation may e.g. reduce the risk for heat induced damages of the plastic material of the envelope, thereby allowing for relatively more heat sensitive plastic materials to be used. A smaller lighting device may also be achieved as the envelope can be arranged relatively closer to the light source without risking to be heat damaged. Further, a relatively lower heat generation may reduce the risk for a user to be burned when touching the envelope, thereby facilitating handling of the lighting device during operation.

Red/green/blue (RGB) LEDs may advantageously be used to provide dynamic color light and/or white light output from the lighting device. The solid state elements may be of the same type or of different types.

According to a second aspect of the present invention, a method for manufactuing a lighting device comprising a light source, a base extending along a nominal optical axis, and an at least partly light-transmitting envelope is provided. The method comprises arranging the envelope such that it at least partly encloses the light source. Further, the envelope is arranged such that a first portion of the envelope is adapted to output light emitted by the light source, and such that a second portion of the envelope is elastic such that its extension and orientation relative to the nominal optical axis is adjustable.

According to an embodiment, an at least partly light transmitting material is arranged in a mold having a surface structure arranged on an inner surface portion of the mold. The plastic material is then blow molded to form the envelope, which is removed from the mold. The surface structure is at least partly transferred to the plastic material during the blow molding, thereby forming the light refracting portion at the envelope.

The optical structure, such as e.g. a diffractive or refractive optical structure, may be designed to allow for a desired optical effect and patterned in a surface of the mold, such that the optical structure can be transferred to the surface of the bulb. A desired optical effect can thus be obtained from the envelope itself.

It will however be appreciated that the plastic envelope can be manufactured using other plastic molding techniques as well, such as e.g. injection molding. Transparent or at least partly light transmitting materials might include polyethylene terephtalate (PET) or transparent polyethylene (PE), polypropylene (PP), poly(vinyl chloride) (PVC) or others.

While it is difficult to introduce fine structures in a typical metal mold, fine, diffractive optical elements or surface structures can be introduced into a blow molding mold and then transferred to the blow molded plastic envelope as an optical structure. It will however be appreciated that the optical structure may be formed using other 3D-patterning techniques as well, such as e.g. stamping, micro stamping or surface contact imprint lithography (SCIL).

The optical structures which may be transferred to the surface of the bulb may be manifold, yet grouped into several subtopics. For example, polychromatic, monochromatic, near and far fields, refractive and diffractive effects may be achieved, including projection of images. Therefore, color versus angle distribution from the bulb may be modified, corrected or strengthened. The effects may therefore be beam forming, decorative, watermarking, collimating, diffusing, color mixing or more.

Other objectives, features and advantages of the present invention will appear from the following detailed disclosure as well as from the drawings.

Generally, all terms used in the claims are to be interpreted according to their ordinary meaning in the technical field unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated. Further, it will be appreciated that the various embodiments described for the lighting device according to the first aspect are all combinable with embodiments of the method as defined in accordance with the second aspect.

BRIEF DESCRIPTION OF THE DRAWINGS

These and other aspects will now be described in more detail with reference to the appended drawings showing embodiments of the present invention.

FIGS. 4a to c show cross-sectional side views of a lighting device similar to the one shown in FIGS. 3a and b.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION

The present aspects will now be described more fully hereinafter with reference to the accompanying drawing, in which currently preferred embodiments are shown. The invention may be embodied in many different forms and should not be construed as limited to the embodiments set forth herein; rather, these embodiments are provided for thoroughness and completeness, and fully convey the scope of the present aspects to the skilled person.

Figure 1:
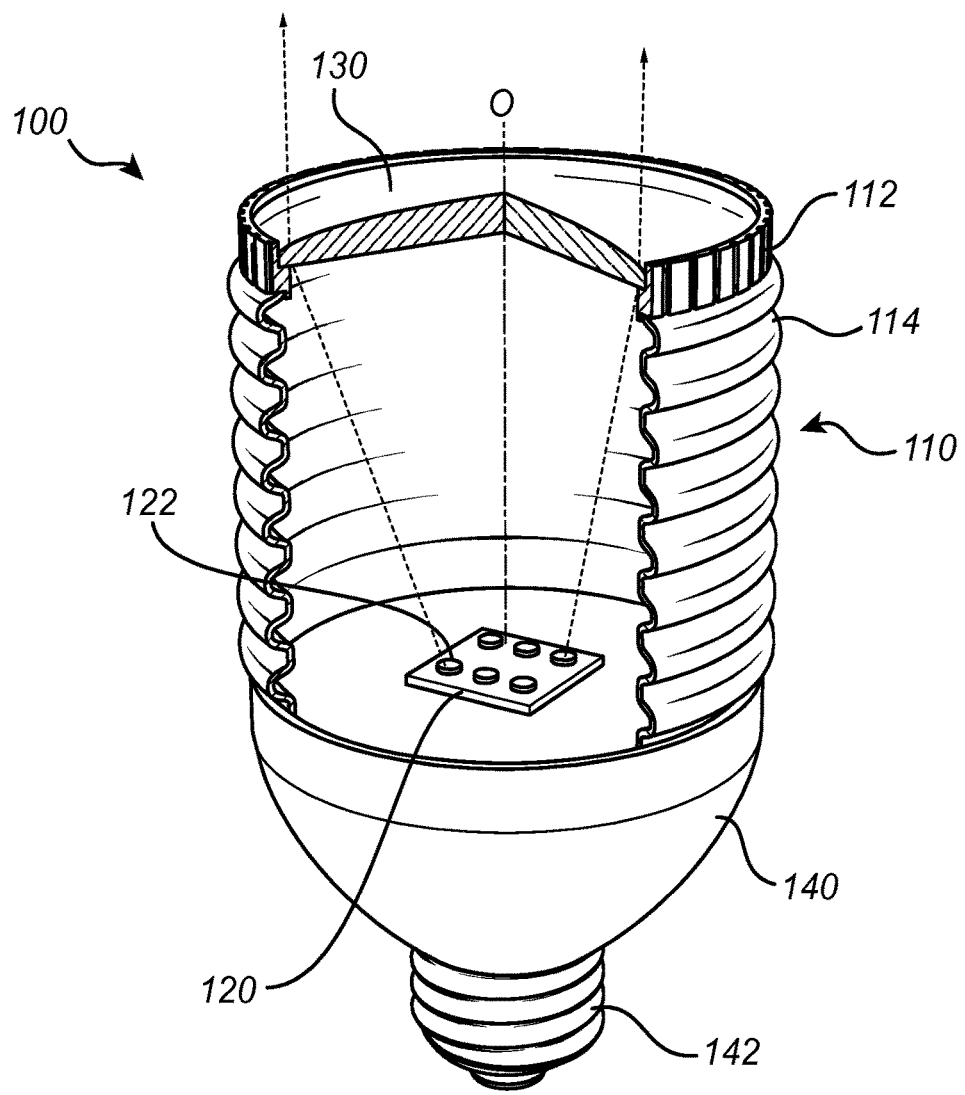
FIG. 1 shows a perspective view of a lighting device according to an embodiment.

FIG. 1 illustrates a lighting device 100 according to an embodiment of the present invention. In line with the present embodiment, the lighting device 100 may comprise a light source 120 with an array of solid state light sources such as e.g. LEDs 122. The light source 120 may be attached to a base 140 having a socket 142 for electrical power supply. The base 140 extends along a nominal optical axis O. An at least partly light transmitting envelope 110, such as e.g. a blow molded plastic envelope 110, may be arranged to at least partly enclose the light source 120. The envelope 110 may comprise a first portion 112 adapted to output light emitted by the light source 120 and a second portion 114 that is elastic such that its extension and orientation relative to the nominal optical axis O or base 140 is adjustable. According to some embodiments, the second portion 114 may be attached to the base 140 of the lighting device 100 and arranged between the base 140 and the first portion 112 as seen along the nominal optical axis O. In other words, the first portion 112 may be arranged farther from the light sources in an optical path of the lighting device compared to the second portion 114, which may be arranged relatively closer to the light source 120 (and the base 140).

The first portion 112 may comprise an optical structure 130, such as e.g. microgrooves forming a Fresnel lens 130, which may be adapted to redirect and output light from the light source 120. In FIG. 1, a path of light is indicated by arrows. The first portion 112 may e.g. be configured to output a light beam that e.g. can be projected in the far field or the near field.

The second portion may be adapted to transmit at least some light emitted from the light source 120. The light may e.g. be emitted from the light source 120 along the nominal optical axis O. Alternatively, or additionally, the second portion 114 may be at least partly light reflecting so as to reflect light emitted from the light source 120 back into the enclosure defined by the envelope 110.

According to some embodiments, and as shown in FIG. 1, the second portion 114 may be foldable and bellow-shaped such that it is extendible and compressible along the nominal optical axis O. The bellow-shaped second portion 114 may also be bendable in a direction intersecting the nomial optical axis O, such that the nominal optical axis O may intersect a wall portion of the envelope 110.

The envelope 110 may e.g. be formed of a blow molded and at least partly light transmitting plastic material.

Figure 2:
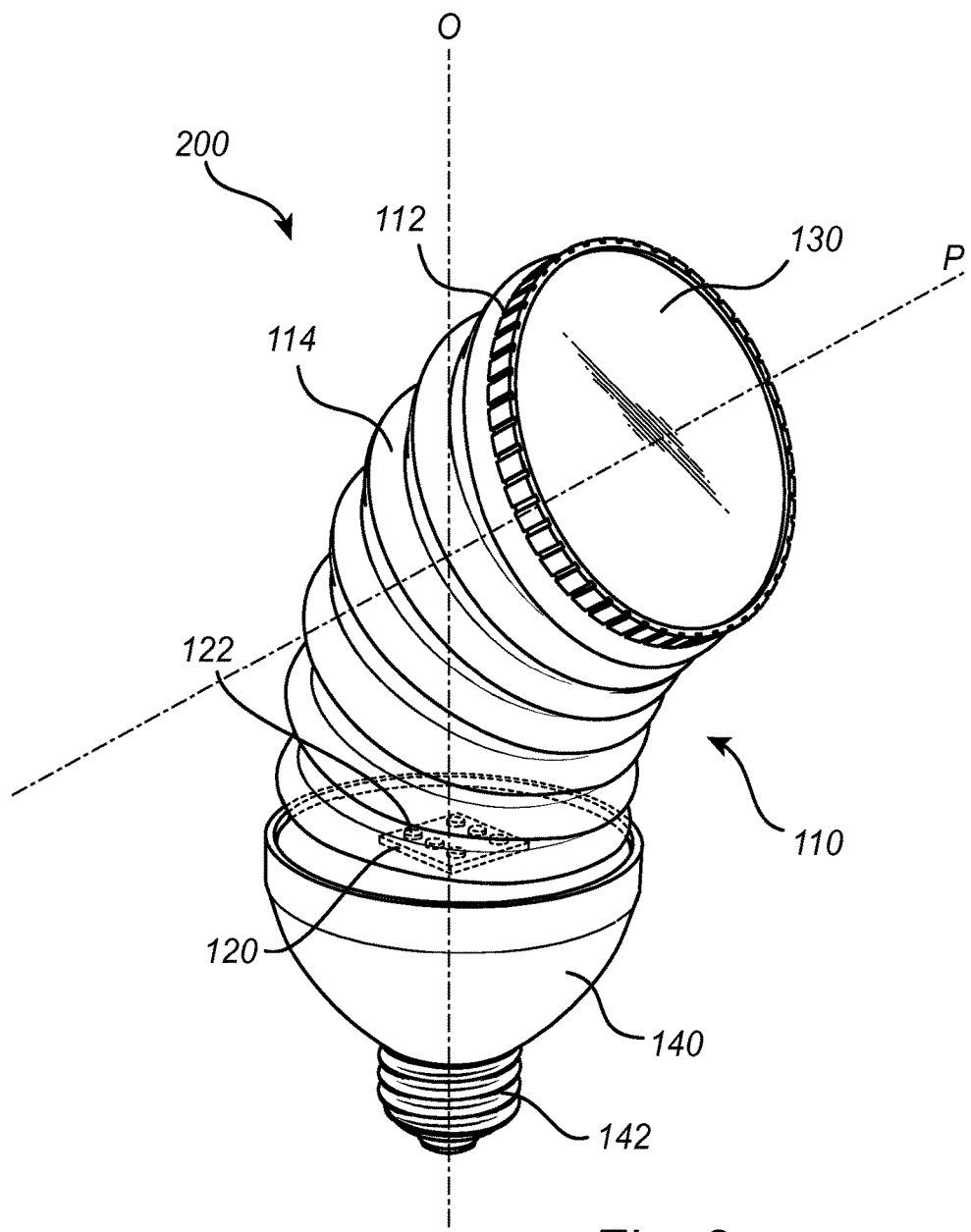
FIG. 2 shows a perspective view of a lighting device according to another embodiment.

FIG. 2 illustrates a lighting device 200 according to an embodiment, which may be similarly configured as the lighting device described with reference to FIG. 1. As shown in FIG. 2, the second portion 114 of the envelope 110 may be bendable in a direction intersecting the nominal optical axis O, thereby allowing a light beam to be emitted from the lighting device 200 along an optical path P and at a desired angle relative to the nominal optical axis O.

Figures 3A, 3B:
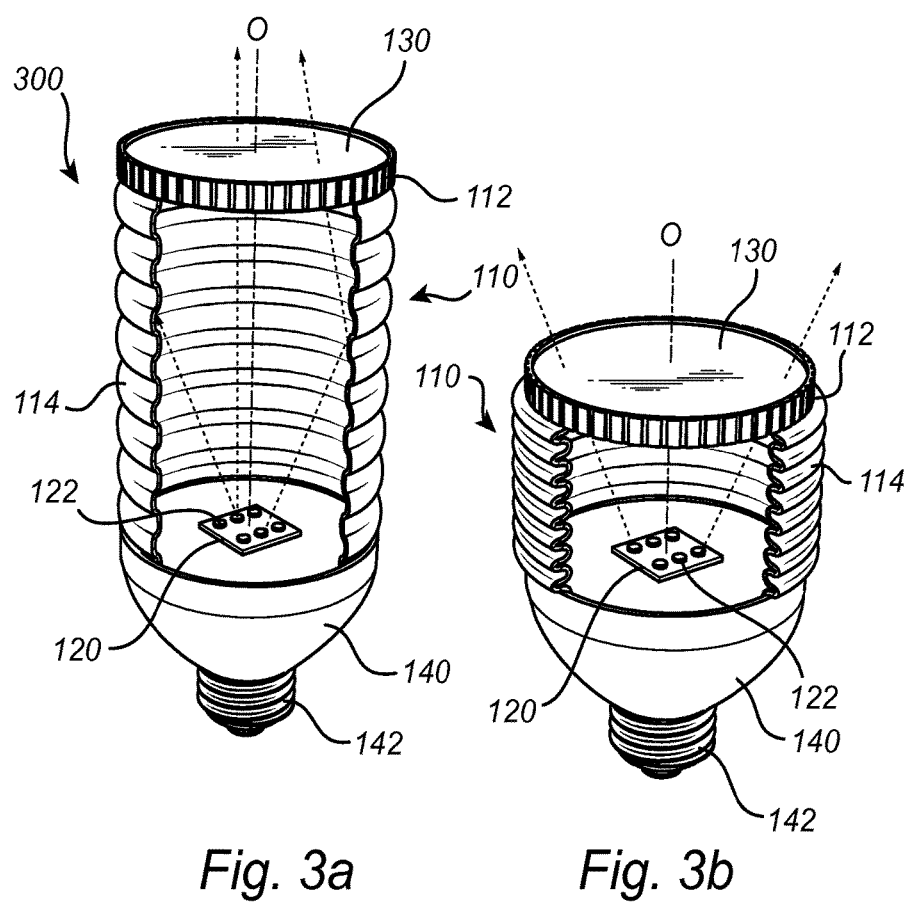
FIGS. 3a and b illustrate a lighting device according to a further embodiment.

FIGS. 3a and b show a lighting device 300 according to another embodiment similar to the embodiments described in connection which FIGS. 1 and 2. According to this embodiment, the second portion 114 may be arrangeable in a nominal state (see FIG. 1) from which the second portion is extendible into a first state (illustrated in FIG. 3a) and compressible into a second state (illustrated in FIG. 3b). In the first state, the extension of the second portion 114 along the nominal optical axis O has been increased compared to the extension in the nominal state. In the second state the extension along the nominal optical axis O has been reduced compared to the extension in the nominal state. The second portion 114 may e.g. be bellow-shaped and configured to be at least partly unfolded in the extended (first) state and at least partly folded in the compressed (second) state.

The first portion 112 may in the extended state be arranged farther away from the light source 120 as compared to the nominal state. In the compressed state, the first portion 112 may be arranged closer to the light source 120 as compared to the nominal state. The extension of the second portion 114 along the nominal optical axis O, and hence the distance between a light exiting surface 130 of the first portion 112 and the light source 120, may e.g. affect the cone angle or distribution angle of light output through the light exiting surface 130 of the first portion 112. In its extended state, the second portion 114 may have an enhanced collimating effect that may reduce the cone angle of the output light as compared to the second portion 114 in its compressed state. The second portion 114 may e.g. be arranged to reflect at least some light emitted by the light source 120. The arrows in FIGS. 3a and 3b indicate the path of emitted light.

Figure 4B:
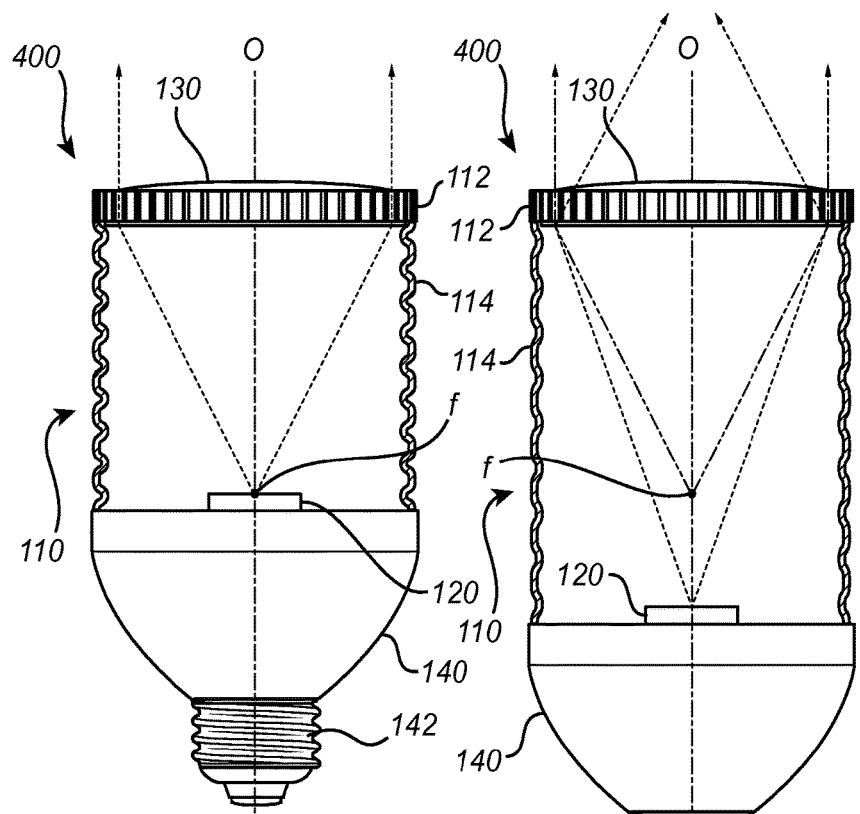
Figure 4B:
Figure 4C:
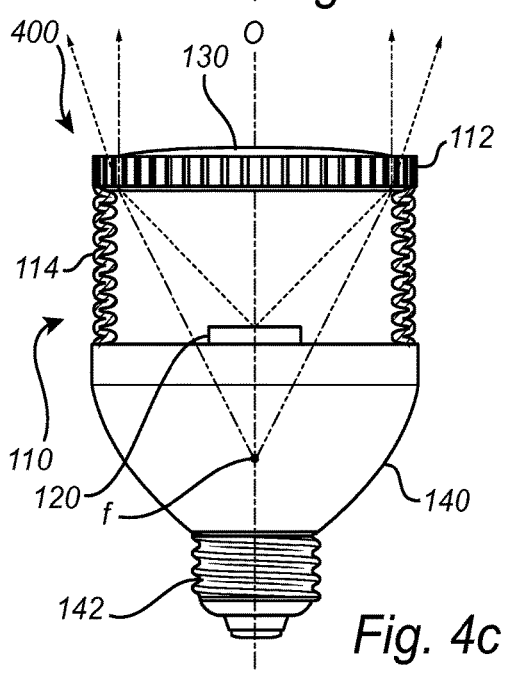

FIGS. 4a-c are schematic cross-sections of a lighting device 400 similarly configured as the lighting devices described with reference to FIGS. 1 to 3. The focal point f of the first portion 112, which e.g. may be formed as a refracting lens 130, may be arranged at a position along the nominal optical axis O of the base 140. Even though the focal point f appears to coincide with the nominal optical axis O in FIGS. 4a-c, it will be appreciated that the focal f point may be located at other, off-axis positions. Imaginary rays of light originating from the focal point f are indicated by dashed lines. Light generated by the light source 120 is represented by arrows passing through the lens 130. According to some embodiments, the first portion 112 may comprise a lens 130 arranged to redirect light output from the first portion 112. Further, the second portion 114 may be foldable, such as e.g. bellow-shaped, to allow the focal point f to be movable along the nominal optical axis O.

In FIG. 4a, the focal point f may be arranged at a position coinciding with a position of the light source 120, thereby allowing a relatively collimated light beam to be emitted from the lighting device via the first portion 112.

An expanded second portion 114 of the envelope 110 is shown in FIG. 4b, wherein the focal point f may be arranged between the light source 120 and the lens 130. Light emitted by the light source 120 may thus be refracted and focused by the lens 130 at a point outside the lighting device 400. The position of this point can be controlled by adjusting the distance between the focal point f and the light source 120, which e.g. may be achieved by extending or compressing the second portion 112, or by bending the second portion 112 in a direction intersecting the nominal optical axis O of the base 140.

In FIG. 4c, a compressed second portion 114 is shown, wherein the extension of the second portion 114 along the nominal optical axis O may be reduced to such an extent that the focal point f may be arranged at a position behind the light source 120 as seen from the lens 130. This may result in a divergent light beam having a relatively wider cone angle.

Figure 5A:
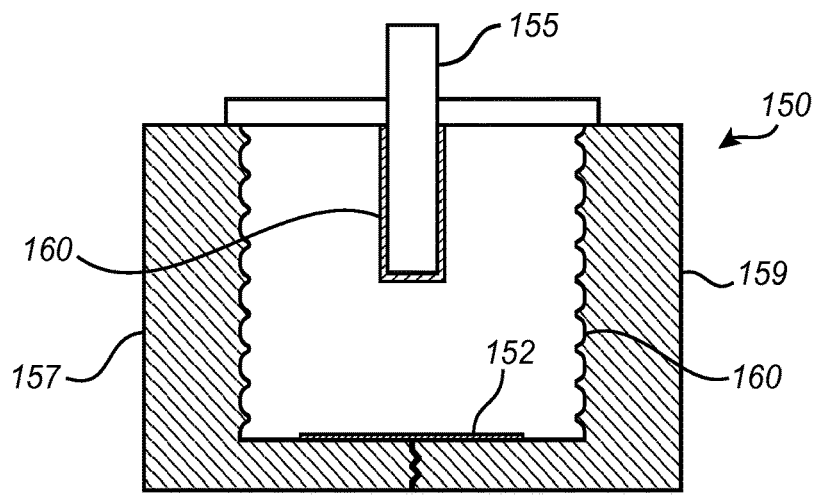
FIGS. 5a-c schematically illustrate a blow molding process according to an embodiment.
Figure 5B:
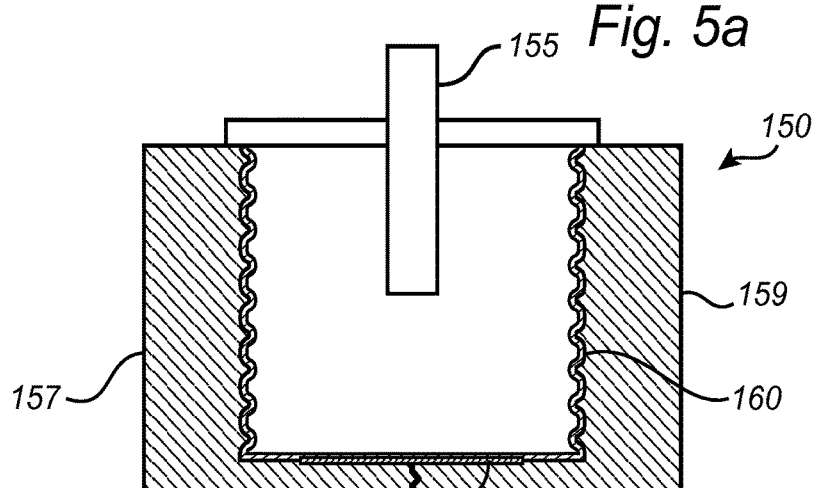
Figure 5C:
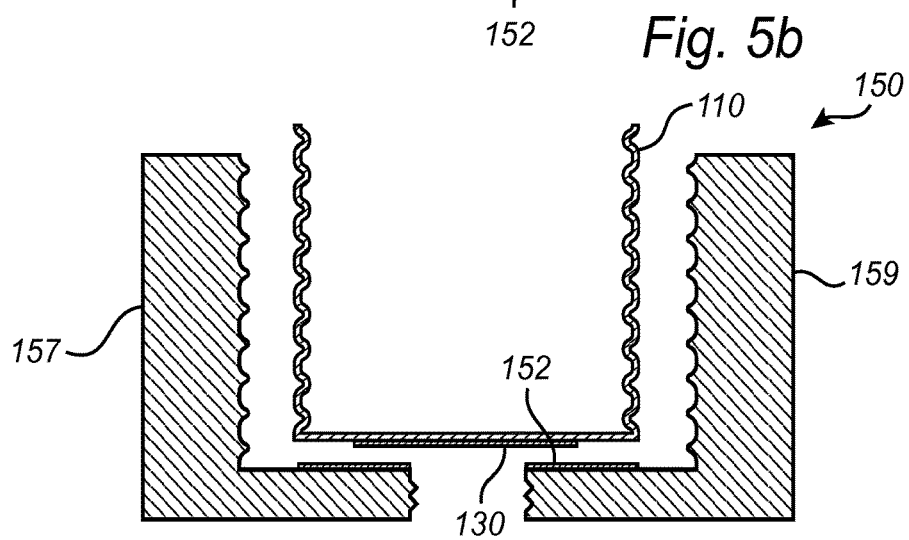

FIGS. 5a-c illustrate a blow molding process according to an embodiment of the present invention. The mold 150 may have a surface structure 152 arranged on an inner surface portion of the mold 150. The mold 150 may comprise two parts 157, 159 that can be joined during the blow molding process and disjoined so as to allow for the blow molded envelope 110 to be removed from the mold. In FIG. 5a, an at least partly light transmitting plastic material 160, which may be arranged on a blowing rod 155, has been introduced in the mold 150. In FIG. 5b, the plastic material 160 has been expanded by e.g. air, supplied by the blowing rod 155, such that the plastic material 160 forms a thin plastic layer that may be pressed against the inner surface of the mold 150 and hence against the surface structure 152. The surface structure 152, which may comprise both extrusions and indentations, hence may form an imprint or embossing in an outer surface of the plastic layer, thereby transferring the surface structure 152 of the mold 150 into an optical structure 130 at the resulting envelope 110, such as at the first portion 112 of the envelope 110. As shown in FIG. 5c, the mold 150 may be disjoined, the blowing rod 155 retracted and the blow molded envelope 110 removed.

Figure 6:
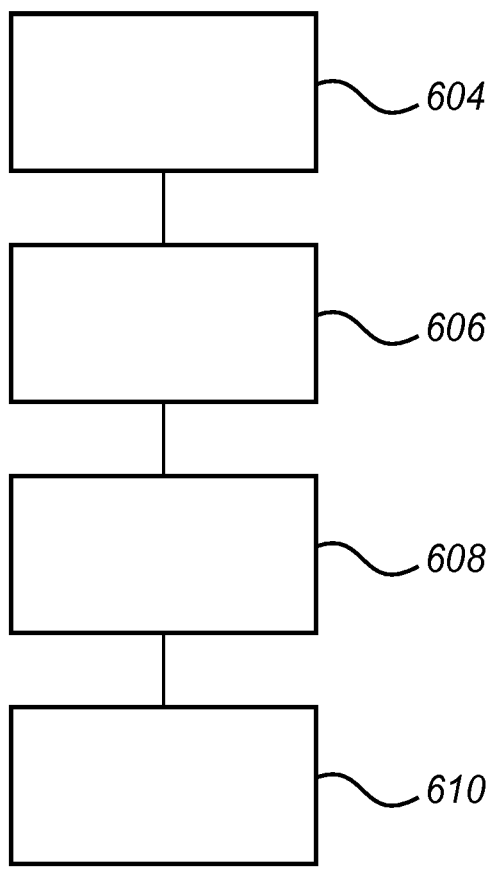
FIG. 6 is a flow chart illustrating a method for manufacturing a lighting device according to an embodiment.

FIG. 6 schematically illustrates a method according to an embodiment of the present invention. The method comprises arranging 610 an at least partly light-transmitting envelope such that it at least partly encloses the light source, wherein a first portion of the envelope is adapted to output light emitted by the light source and a second portion of the envelope is elastic such that its extension and orientation relative to the nominal optical axis is adjustable. The method further comprises the optional steps of arranging 604 an at least partly light transmitting plastic material in a mold having a surface structure arranged on an inner surface portion of the mold, blow molding 606 the plastic material so as to form the envelope, wherein the surface structure is at least partly transferred to the plastic material so as to form an optical structure at a first portion of the envelope, and removing 608 the envelope from the mold.

The person skilled in the art realizes that the present invention by no means is limited to the preferred embodiments described above. On the contrary, many modifications and variations are possible within the scope of the appended claims.

Additionally, variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

The invention claimed is:

1. A lighting device, comprising: a light source;
   a base arranged to extend along a nominal optical axis; and
   an at least partly light-transmitting envelope arranged to at least partly enclose the light source; the at least partly light-transmitting envelope comprising:
   a first portion comprising an optical structure and adapted to output at least part of light emitted by the light source; and
   a second portion being elastic such that its extension and orientation relative to the nominal optical axis is adjustable, said second portion being attached to the base of the lighting device and arranged between the base and the first portion,
   wherein the second portion is bendable from a nominal shape in which the optical structure is aligned with the nominal optical axis and configured to emit a light beam along the nominal optical axis to a bent shape in which the nominal optical axis intersects a wall of the second portion and an optical path of the light beam emitted by the optical structure is at an angle relative to the nominal optical axis, and wherein the second portion is axially extendible and compressible from the nominal shape such that a focal point of the first portion is moveable at least along the nominal optical axis.

2. The lighting device according to claim 1, wherein said light beam has a distribution angle relative to the optical path of the light beam, and wherein the second portion is extendible and compressible such that the distribution angle is adjustable.

3. The lighting device according to claim 1, wherein the second portion is arrangeable in a nominal state from which the second portion is extendible into a first state and compressible into a second state, the first state and the second state differing from each other and from the nominal state in terms of extension or orientation relative to the nominal optical axis.

4. The lighting device according to claim 3, wherein, in the nominal state, the focal point of the first portion coincides with a position of the light source.

5. The lighting device according to claim 1, wherein the second portion is reversibly foldable.

6. The lighting device according to claim 1, wherein the second portion is bellow-shaped.

7. The lighting device according to claim 1, wherein an outer surface of the first portion is provided with an optical structure comprising at least one of grooves, protrusions, micro-grooves, micro-protrusions, micro-prismatic grooves, micro-prismatic protrusions, a lens, a Fresnel lens and a diffraction grating.

8. The lighting device according to claim 1, wherein the first portion and the second portion form a single piece.

9. The lighting device according to claim 1, wherein at least one of the first portion and the second portion comprises an at least partly light transmitting plastic material.

10. The lighting device according to claim 1, wherein at least one of the first portion and the second portion is formed of a blow molded plastic material.

11. The lighting device according to claim 1, wherein the light source is a solid state light source.

12. A method for manufacturing a lighting device comprising a light source, a base extending along a nominal optical axis, and an at least partly light-transmitting envelope, said method comprising:
    arranging the at least partly light transmitting envelope such that: it at least partly encloses the light source;
    a first portion of the at least partly light-transmitting envelope is adapted to output light emitted by the light source; and
    a second portion of said at least partly light-transmitting envelope is elastic such that its extension and orientation relative to the nominal optical axis is adjustable;
    wherein the second portion is bendable from a nominal shape in which the optical structure is aligned with the nominal optical axis to a bent shape in which the nominal optical axis intersects a wall of the second portion and an optical path of a light beam emitted by the optical structure is at an angle relative to the nominal optical axis and wherein the second portion is axially extendible and compressible from the nominal shape such that a focal point of the first portion is moveable at least along the nominal optical axis.

13. The method according to claim 12, further comprising:
    arranging an at least partly light transmitting plastic material in a mold having a surface structure arranged on an inner surface portion of the mold;
    blow molding the plastic material so as to form the at least partly light-transmitting envelope, the surface structure being at least partly transferred to the at least partly light transmitting plastic material to form an optical structure at a first portion of the envelope; and
    removing the at least partly light-transmitting envelope from said mold.

* * * * *